US010643192B2

(12) United States Patent
Bryant et al.

(10) Patent No.: US 10,643,192 B2
(45) Date of Patent: May 5, 2020

(54) DATA TRANSFER BETWEEN SELF-SERVICE DEVICE AND SERVER OVER SESSION OR CONNECTION IN RESPONSE TO CAPTURING SENSOR DATA AT SELF-SERVICE DEVICE

(71) Applicant: Bank of America Corporation, Charlotte, NC (US)

(72) Inventors: Matthew K. Bryant, Gastonia, NC (US); Nathan Dent, Concord, NC (US); Nicholas Munson, Waxhaw, NC (US); Alejandro Vargas, Charlotte, NC (US)

(73) Assignee: Bank of American Corporation, Charlotte, NC (US)

( * ) Notice: Subject to any disclaimer, the term of this patent is extended or adjusted under 35 U.S.C. 154(b) by 231 days.

(21) Appl. No.: 15/256,928

(22) Filed: Sep. 6, 2016

(65) Prior Publication Data
US 2018/0068285 A1    Mar. 8, 2018

(51) Int. Cl.
*G06Q 20/10* (2012.01)
*G06Q 20/18* (2012.01)
(Continued)

(52) U.S. Cl.
CPC ..... *G06Q 20/1085* (2013.01); *G06Q 20/0453* (2013.01); *G06Q 20/18* (2013.01);
(Continued)

(58) Field of Classification Search
CPC ...... G07F 19/207; G07F 19/20; G07F 19/209; G07F 19/2055; G06Q 20/1085;
(Continued)

(56) References Cited

U.S. PATENT DOCUMENTS 5,253,167 A * 10/1993 Yoshida ............. G06Q 20/1085
235/379
5,984,178 A * 11/1999 Gill .................... G06Q 20/1085
235/376
(Continued)

OTHER PUBLICATIONS

De Lemos, Rogerio; Timmis, Jon; Ayara, Modupe; Forrest, Simon, "Immune-Inspired Adaptable Error Detection for Automated Teller Machines", pp. 1-14. (Year: 2007).*
(Continued)

*Primary Examiner* — Mohammad Z Shaikh
(74) *Attorney, Agent, or Firm* — Banner & Witcoff, Ltd.; Michael A. Springs

(57) ABSTRACT

A method, apparatus, computer-readable medium, and/or system may comprise a server having a first processor, a database, and first memory storing computer-executable instructions. The system may comprise a self-service device having a second processor, a plurality of sensors configured to capture images, and second memory storing computer-executable instructions that, when executed by the second processor, cause the self-service device to detect a start of user activity at the self-service device. In response to detecting the start of the user activity at the self-service device, the self-service device may capture, by one or more of the plurality of sensors, a plurality of images of the user activity at the self-service device. The self-service device may detect an end of the user activity at the self-service device. In response to detecting the end of the user activity at the self-service device, the self-service device may generate data indicative of the user activity at the self-service device. The data indicative of the user activity at the self-service device may comprise the plurality of images of the user activity captured by the one or more of the plurality of sensors. The self-service device may establish a connection between the self-service device and the server. The self- (Continued)

service device may transmit, to the server and via the established connection, the data indicative of the user activity at the self-service device.

18 Claims, 6 Drawing Sheets

(51) Int. Cl.
    *H04L 29/08*     (2006.01)
    *G06Q 20/34*     (2012.01)
    *G06Q 20/40*     (2012.01)
    *G06Q 20/04*     (2012.01)

(52) U.S. Cl.
    CPC ..... *G06Q 20/341* (2013.01); *G06Q 20/40145* (2013.01); *H04L 67/22* (2013.01)

(58) Field of Classification Search
    CPC ........... G06Q 20/18; G06Q 10/063114; G06Q 20/401; G06Q 20/40145; H04L 1/0061; G06F 11/1464; G06F 21/32; G06F 21/31; G06F 3/013
    See application file for complete search history.

(56) References Cited

U.S. PATENT DOCUMENTS

| | | | | |
|---|---|---|---|---|
| 6,111,517 | A * | 8/2000 | Atick | G06F 21/32 340/5.83 |
| 6,367,695 | B1 * | 4/2002 | Mair | G07F 19/20 235/379 |
| 6,400,276 | B1 * | 6/2002 | Clark | G07F 19/20 340/541 |
| 7,032,245 | B2 * | 4/2006 | Scarafile | G06Q 20/18 235/375 |
| 7,118,031 | B2 * | 10/2006 | Ramachandran | G06Q 20/18 235/379 |
| 7,147,147 | B1 * | 12/2006 | Enright | G06Q 20/042 235/379 |
| 7,163,144 | B1 * | 1/2007 | Trelawney | G06Q 40/00 235/379 |
| 7,229,012 | B1 * | 6/2007 | Enright | G06Q 20/042 235/379 |
| 7,240,827 | B2 * | 7/2007 | Ramachandran | G07F 19/20 235/379 |
| 7,295,993 | B1 * | 11/2007 | Meek | G06Q 20/1085 705/14.1 |
| 7,575,166 | B2 * | 8/2009 | McNamara | G06Q 20/18 235/379 |
| 7,583,290 | B2 * | 9/2009 | Enright | G06Q 20/18 348/143 |
| 7,798,395 | B2 * | 9/2010 | Ramachandran | G06Q 20/1085 235/379 |
| 7,832,629 | B1 * | 11/2010 | Ramachandran | G07F 19/207 235/375 |
| 7,942,313 | B1 * | 5/2011 | Grimm | G06Q 20/042 235/375 |
| 8,002,176 | B2 * | 8/2011 | Jenkins | G06Q 40/00 235/379 |
| 8,015,455 | B1 * | 9/2011 | Vannatter | G06Q 10/00 714/47.1 |
| 8,243,465 | B2 * | 8/2012 | Itaya | H01L 23/50 257/686 |
| 8,302,854 | B1 * | 11/2012 | Grimm | G06Q 20/042 235/379 |
| 8,313,020 | B2 * | 11/2012 | Ramachandran | G06Q 20/042 235/379 |
| 8,395,500 | B1 * | 3/2013 | Dent | G08B 23/00 340/540 |
| 8,396,766 | B1 * | 3/2013 | Enright | G07F 19/207 705/35 |
| 8,468,074 | B2 * | 6/2013 | Schrick | G06Q 40/00 705/35 |
| 8,806,275 | B1 * | 8/2014 | Vannatter | G06Q 10/00 714/2 |
| 9,064,043 | B2 * | 6/2015 | Cathro | G06F 11/3476 |
| 9,129,493 | B2 * | 9/2015 | St. George | G07G 1/0018 |
| 9,135,787 | B1 * | 9/2015 | Russell | G07F 19/201 |
| 9,342,963 | B1 * | 5/2016 | McGraw, IV | G07F 19/00 |
| 9,368,002 | B2 * | 6/2016 | Crist | G07F 19/207 |
| 9,697,524 | B1 * | 7/2017 | Fischer | G06Q 30/016 |
| 9,779,452 | B1 * | 10/2017 | Medina | G06Q 20/1085 |
| 2002/0133461 | A1 * | 9/2002 | Ramachandran | G06Q 20/1085 705/43 |
| 2003/0044168 | A1 * | 3/2003 | Matsukawa | G08B 13/19641 386/223 |
| 2004/0024709 | A1 * | 2/2004 | Yu | G06Q 20/105 705/43 |
| 2005/0205675 | A1 * | 9/2005 | Savage | G07F 19/20 235/436 |
| 2006/0054684 | A1 * | 3/2006 | Li | G07F 19/20 235/379 |
| 2006/0131380 | A1 * | 6/2006 | Forrest | G07F 9/026 235/376 |
| 2006/0289630 | A1 * | 12/2006 | Updike | G06Q 20/04 235/379 |
| 2007/0138255 | A1 * | 6/2007 | Carreon | G06Q 20/042 235/379 |
| 2008/0121692 | A1 * | 5/2008 | MacPhail | G06Q 20/00 235/379 |
| 2008/0204403 | A1 * | 8/2008 | Verbeek | G07F 19/20 345/156 |
| 2009/0201372 | A1 * | 8/2009 | O'Doherty | G07F 19/20 348/150 |
| 2010/0119250 | A1 * | 5/2010 | Itoh | G03G 15/5016 399/81 |
| 2011/0068169 | A1 * | 3/2011 | Ross | G06K 7/0008 235/379 |
| 2011/0087611 | A1 * | 4/2011 | Chetal | G06K 9/00892 705/325 |
| 2011/0161498 | A1 * | 6/2011 | Guntupalli | G07F 19/20 709/227 |
| 2011/0231705 | A1 * | 9/2011 | McGraw, IV | G07F 19/20 714/27 |
| 2012/0038772 | A1 * | 2/2012 | Priesterjahn | G07F 19/207 348/150 |
| 2012/0038775 | A1 * | 2/2012 | Priesterjahn | G07F 19/20 348/150 |
| 2012/0219192 | A1 * | 8/2012 | Noguchi | G06K 9/00261 382/118 |
| 2013/0208295 | A1 * | 8/2013 | Bryant | G06F 11/008 358/1.14 |
| 2014/0084052 | A1 * | 3/2014 | Wayne | G06Q 10/06 235/375 |
| 2014/0108244 | A1 * | 4/2014 | Bryant | G07F 19/209 705/43 |
| 2014/0188722 | A1 * | 7/2014 | Xie | G07C 11/00 705/42 |
| 2014/0279492 | A1 * | 9/2014 | McGraw | G07F 19/209 705/43 |
| 2015/0178664 | A1 * | 6/2015 | Neilan | G06Q 10/063114 705/7.15 |
| 2015/0206422 | A1 * | 7/2015 | Priesterjahn | G07F 19/207 348/150 |
| 2017/0053284 | A1 * | 2/2017 | Votaw | G06Q 20/40145 |

OTHER PUBLICATIONS

M, Raj; Julian, Anitha, "Design and Implementation of Anti-Theft ATM Machine using Embedded Systems", IEEE, 2015, pp. 1-5. (Year: 2015).*
"Bank ATMS stop sucking in cash after RBI direction", EconomicTimes.com, Sep. 23, 2012, p. 1. (Year: 2012).*

* cited by examiner

DATA TRANSFER BETWEEN SELF-SERVICE DEVICE AND SERVER OVER SESSION OR CONNECTION IN RESPONSE TO CAPTURING SENSOR DATA AT SELF-SERVICE DEVICE

TECHNICAL FIELD

One or more aspects of the disclosure generally relate to computing devices, computing systems, and computer software. In particular, one or more aspects of the disclosure generally relate to computing devices, computing systems, and computer software that may be used to transfer data between one or more self-service device and one or more server over a session and/or connection, such as in response to capturing sensor data at the self-service device.

BACKGROUND

Customers often perform transactions at self-service devices. However, information associated with the transactions might not be properly transferred and/or stored. What is needed is a more efficient and secure way of transferring data between self-service devices and servers over a data connection.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, computer-readable medium, and/or system may comprise a server having a first processor, a database, and first memory storing computer-executable instructions. The system may comprise a self-service device having a second processor, a plurality of sensors configured to capture images, and second memory storing computer-executable instructions that, when executed by the second processor, cause the self-service device to detect a start of user activity at the self-service device. In response to detecting the start of the user activity at the self-service device, the self-service device may capture, by one or more of the plurality of sensors, a plurality of images of the user activity at the self-service device. The self-service device may detect an end of the user activity at the self-service device. In response to detecting the end of the user activity at the self-service device, the self-service device may generate data indicative of the user activity at the self-service device. The data indicative of the user activity at the self-service device may comprise the plurality of images of the user activity captured by the one or more of the plurality of sensors. The self-service device may establish a connection between the self-service device and the server. The self-service device may transmit, to the server and via the established connection, the data indicative of the user activity at the self-service device. In some aspects, the first memory of the server may store computer-executable instructions that, when executed by the first processor, cause the server to receive, from the self-service device and via the established connection, the data indicative of the user activity at the self-service device. After receiving the data indicative of the user activity at the self-service device, the server may store, in the database, the data indicative of the user activity at the self-service device in association with a tag that identifies the user activity.

In some aspects, the plurality of sensors may comprise a video camera. Detecting the start of the user activity at the self-service device may comprise detecting, based on one or more images captured by the video camera, motion of a user in proximity of the self-service device.

In other aspects, detecting the start of the user activity at the self-service device may comprise detecting that a user has initiated a sign on process with the self-service device. Detecting the end of the user activity at the self-service device may comprise detecting that the user has initiated a sign off process with the self-service device.

In yet other aspects, detecting the start of the user activity at the self-service device may comprise detecting that a card has been inserted into a card reader at the self-service device. Detecting the end of the user activity at the self-service device may comprise detecting that the card has been removed from the card reader at the self-service device.

The plurality of sensors may comprise at least one scanner and at least one video camera. The user activity may comprise a user session at the self-service device, and the second memory may store computer-executable instructions that, when executed by the second processor, cause the self-service device to detect a fault during the user session. In response to detecting the fault during the user session, the self-service device may capture, by one or more of the plurality of sensors, one or more image associated with the fault. The self-service device may also detect an activity during the user session that is not a fault. In response to detecting the activity during the user session that is not a fault, the self-service device may also capture, by one or more of the plurality of sensors, one or more image associated with the activity that is not a fault.

In some aspects, the plurality of images may comprise an image of a check captured by a first scanner, an image of a receipt for a check deposit captured by a second scanner or a first camera, and an image of at least a portion of a user's hand or face captured by a second camera. The first memory of the server may store computer-executable instructions that, when executed by the first processor, cause the server to receive a user request for the image of the receipt for the check deposit. In response to receiving the user request, the server may retrieve, from the database, the image of the receipt for the check deposit. The server may then send, to a user device, the image of the receipt for the check deposit.

The database described herein may be configured to store a plurality of discrete data. Each of the plurality of discrete data may be indicative of a user session at the self-service device (or another self-service device), and each of the plurality of discrete data may be stored in association with a corresponding tag that identifies the user session.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
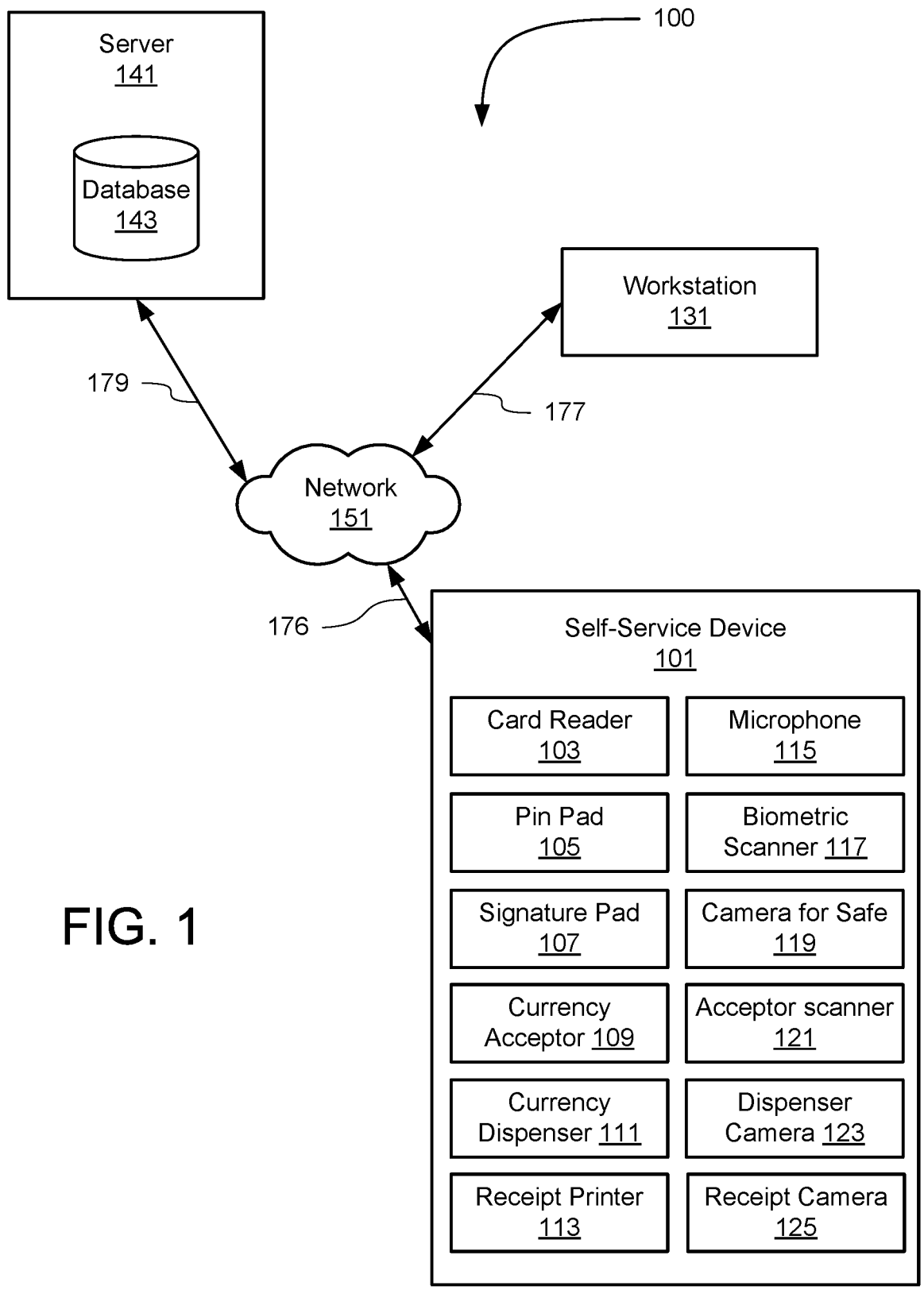
FIG. 1 illustrates an example operating environment in which various aspects of the disclosure may be implemented.

FIG. 1 illustrates an example operating environment in which various aspects of the disclosure may be implemented. An illustrative system 100 for implementing methods according to the present disclosure is shown. System 100 may include one or more self-service devices 101. A self-service device 101 may include, for example, an automated teller machine (ATM), video transaction machine (VTM), or any other type of self-service device. Self-service devices may communicate and/or generate sessions with a server 141 (and other computing devices). Users of a self-service device may communicate and perform transactions with an institution associated with the server 141, without relying on the services of an actual person. Self-service devices 101 may be connected by one or more communications links 176 to a network 151.

The self-service device 101 may comprise a plurality of devices used to, for example, facilitate user interaction with the self-service device 101, to capture data associated with user activity, and/or to facilitate communications with remote devices, such as the server 141. The devices of the self-service device 101 may comprise a plurality of sensors (e.g., video cameras, scanners, motion sensors, microphones, weight sensors, and the like), as will be described in further detail below. Moreover, the devices may be located inside of, outside of, or on the self-service device 101. The devices may be integral with or separate from the self-service device 101.

The self-service device 101 may comprise a card reader 103. The card reader 103 may accept, for example, a user's card, such as a credit card, debit card, bank card, and the like. In some aspects, the card reader 103 may comprise a slot for which the user may enter his or her card and/or may comprise a radio-frequency device, such as a near-field communication (NFC) device, that communicates with an NFC chip on the user's card.

The self-service device 101 may comprise one or more devices for facilitating user interaction with the self-service device 101. For example, the self-service device 101 may include one or more display screens, which may be touch screen displays. The self-service device 101 may comprise a pin pad 105 for the user to provide, for example, a PIN for user authentication. The pin pad 105 may also be used in other circumstances for receiving user input of alphanumeric characters. The self-service device 101 may comprise a signature pad 107, which may be a touch sensitive device for receiving a physical signature from the user.

The self-service device 101 may comprise one or more currency devices, such as a currency acceptor 109 and/or a currency dispenser 111. The currency acceptor 109 may receive currency (e.g., bills, coins, checks, and the like) from a user. The currency dispenser 111 may dispense currency (e.g., bills, coins, checks, and the like) to the user. The self-service device 101 may include a printer, such as a receipt printer 113, for printing a receipt for a transaction (e.g., a check deposit, a withdrawal, and the like).

The self-service device 101 may comprise one or more sensors associated with one or more of the devices described above (or devices not described herein). The sensors may be integrated with or separate from the individual devices described above. For example, the self-service device 101 may comprise an acceptor scanner 121. The acceptor scanner 121 may, in some instances, scan images of items inserted or otherwise deposited into the currency acceptor 109 (e.g., bills, coins, checks, and the like). For example, the acceptor scanner 121 may scan images of the front and back of a check. The self-service device 101 may comprise a dispenser camera 123. The dispenser camera 123 may, for example, capture images (including still images or videos) of items dispensed from the currency dispenser 111 (e.g., bills, coins, checks, and the like). The dispenser camera 123 may also detect motion and/or a user's hand(s) and capture an image of the dispensed items with the user's hand(s) in response to detecting the motion and/or the user's hand(s). The self-service device 101 may comprise a receipt camera 125. The receipt camera 125 may, for example, capture images of receipts printed by the receipt printer 113. The receipt camera 125 may capture images outside of the self-service device 101, such that the camera 125 captures external images of the receipt and/or images of the receipt with the user (e.g., the user's hand, face, and the like). The receipt camera 125 may additionally or alternatively capture images of the receipt inside the self-service device 101.

The self-service device 101 may comprise one or more other sensors. For example, the self-service device may include one or more microphones 115. The microphone(s) 115 may be used by the self-service device 101 to capture audio inside the self-service device 101 (e.g., audio of components or devices within the self-service device 101, for maintenance purposes) or to capture audio outside of the self-service device 101 (e.g., a user's voice, road noise, and the like). The self-service device 101 may comprise one or more biometric scanners 117, such as a fingerprint scanner, an eyeball scanner, a weight scale in front of the self-service device, a video camera for facial recognition, and the like. The scanner 117 may also be used to scan a passport, driver's license, or any other form of user identification. The self-service device 101 may additionally or alternatively comprise a camera for a safe or vault within the self-service device 101. The camera for the safe 119 may be configured to capture images each time the safe door is opened and/or items are removed from the safe (e.g., cash, coins, checks, and the like).

As will be described in further detail below, the sensors described herein may capture sensor data (e.g., images) each time an action with the associated device in the self-service device 101 occurs. For example, each time a user authenticates with the self-service device 101, one or more of the sensors may capture one or more images associated with the authentication (e.g., the user's face, the user's fingerprint, the user's card, and the like). The sensors described herein may be integrated with the self-service device 101 and/or may be separate from the self-service device 101. In some aspects, the self-service device may include a digital video recorder (DVR) for temporarily storing image data captured by one or more of the sensors.

System 100 may include one or more workstations 131. Workstations may include workstations located at facilities associated with the server 141 and may be used by people to facilitate transactions requested by customers of the institutions. Workstations 131 may be connected by one or more communications links 177 to network 151.

System 100 may also include one or more servers 141, which may be any suitable server, processor, computer, or data processing device, or combination of the same. Servers 141 may be owned, managed, and/or operated by a particular institution. Servers 141 may be connected by one or more communications links 179 to network 151. As will be described in further detail in the examples below, servers 104 may receive, via a communication session, data from self-service devices 101 for storage in a database 143 and/or receive requests from users (e.g., via user devices) for one or more images captured by the devices described herein. Furthermore, servers 104 may store, e.g., via the database 143, transaction information (e.g., time, date, type of transaction), user information (e.g., username, account number, PIN, other unique identifiers), and various other information. Any of the elements in FIG. 1 may be implemented as one or more computing device, such as the example computing device 201 described in connection with FIG. 2 below.

Network 151 may be any suitable network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. Communications links 176, 177, and 179 may be any communications links suitable for communicating among self-service devices 101, workstations 131, user devices, and/or servers 141, such as network links, dial-up links, wireless links, hard-wired links, other communications links.

Figure 2:
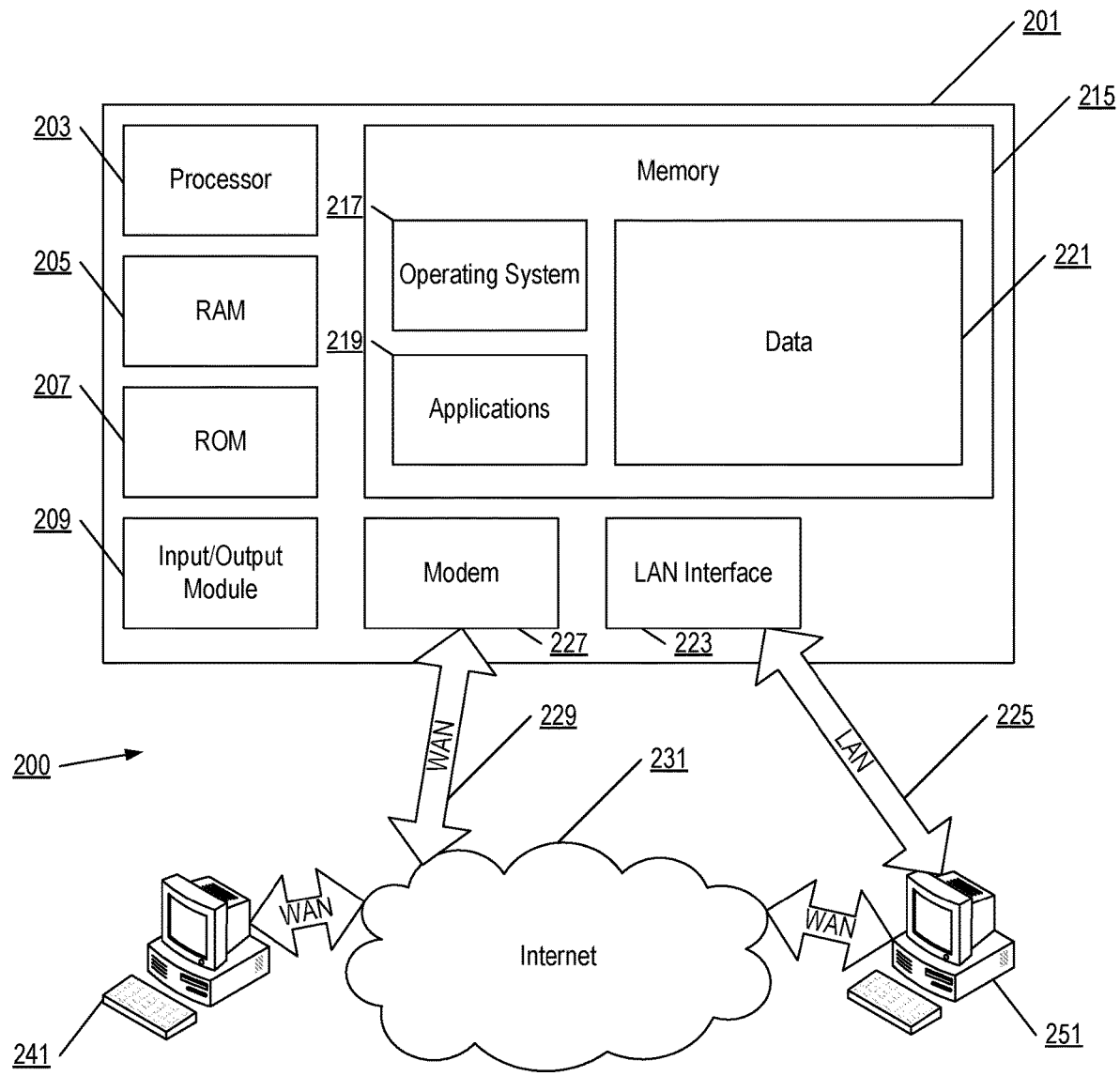
FIG. 2 illustrates another example operating environment in which various aspects of the disclosure may be implemented.

FIG. 2 illustrates an example block diagram of a computing device 201 (e.g., a computer server, desktop computer, laptop computer, tablet computer, other computing devices) in an example computing environment 200 that may be used according to one or more illustrative embodiments of the disclosure. The computing device 201 may have a processor 203 for controlling overall operation of the server and its associated components, including for example random access memory (RAM) 205, read-only memory (ROM) 207, input/output (I/O) module 209, and memory 215.

I/O module 209 may include, e.g., a microphone, mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for enabling computing device 201 to perform various functions. For example, memory 215 may store software used by the computing device 201, such as an operating system 217, application programs 219, and an associated database 221. Additionally or alternatively, some or all of the computer executable instructions for computing device 201 may be embodied in hardware or firmware (not shown).

The computing device 201 may operate in a networked environment supporting connections to one or more remote computers, such as terminals 241 and 251. The terminals 241 and 251 may be personal computers or servers that include any or all of the elements described above with respect to the computing device 201. The network connections depicted in FIG. 2 include a local area network (LAN) 225 and a wide area network (WAN) 229, but may also include other networks. When used in a LAN networking environment, the computing device 201 may be connected to the LAN 225 through a network interface or adapter 223. When used in a WAN networking environment, the computing device 201 may include a modem 227 or other network interface for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 201 and/or terminals 241 or 251 may also be mobile devices (e.g., mobile phones, smartphones, PDAs, notebooks, tablets, other mobile devices) including various other components, such as a battery, speaker, and antennas.

The disclosure is operational with numerous types of general purpose or special purpose computing devices. Examples of well-known computing devices that may be suitable for use with the disclosure (including the system of FIG. 2) include, but are not limited to, desktop computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

Figure 3:
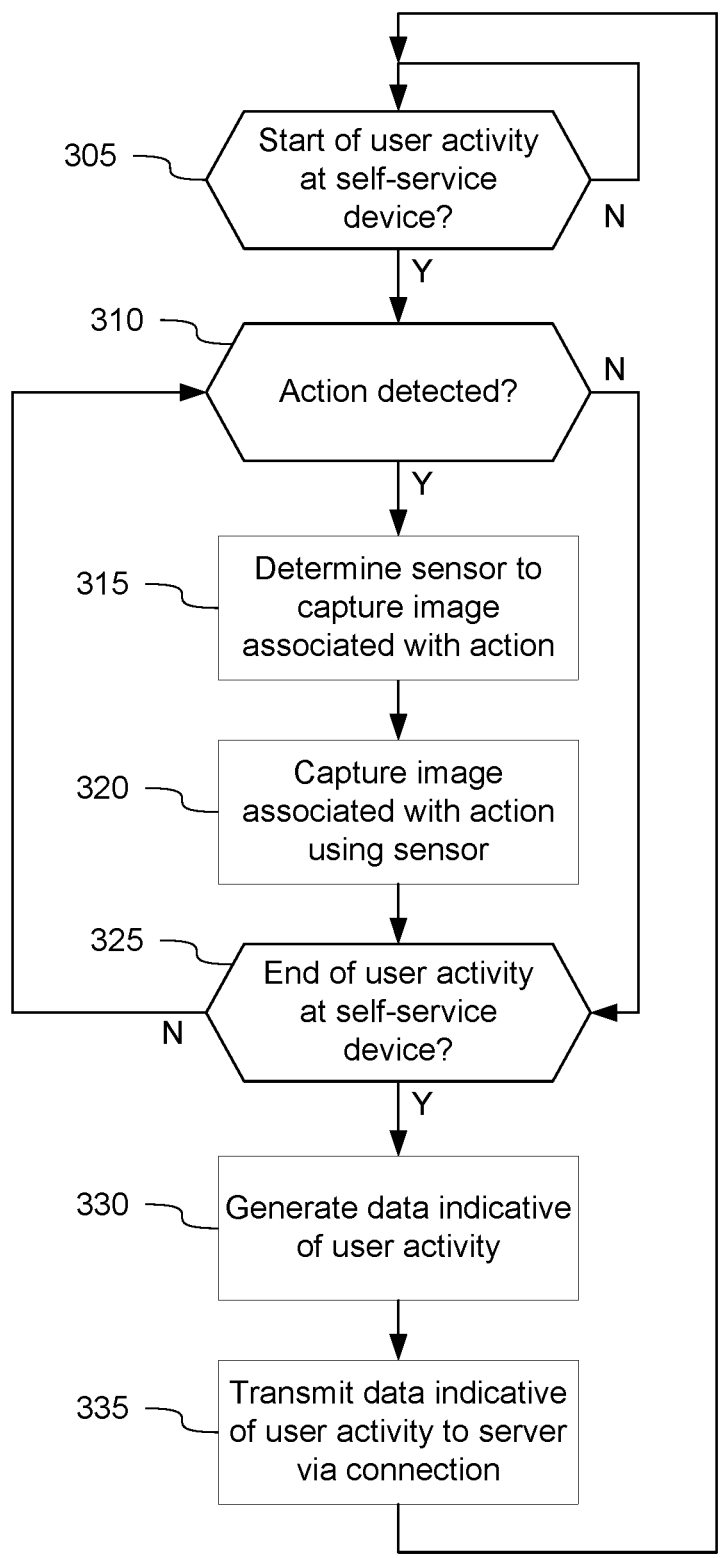
FIG. 3 illustrates an example of at least a portion of a flow diagram for detecting user activity, capturing one or more associated images, and transmitting data indicative of the user activity to a server in which various aspects of the disclosure may be implemented.

FIG. 3 illustrates an example of at least a portion of a flow diagram for detecting user activity, capturing one or more associated images, and transmitting data indicative of the user activity to a server in which various aspects of the disclosure may be implemented.

In step 305, the self-service device may determine whether it has detected the start of user activity at the self-service device. The user activity, for example, may comprise a user session (e.g., transaction) at the self-service device. In some aspects, one of the sensors at the self-service device may comprise a video camera, and the self-service device may detect the start of the user activity at the self-service device by detecting, based on one or more images captured by the video camera, motion of a user in proximity of the self-service device (e.g., within a certain range of the self-service device). In some aspects, the start of the user activity may occur prior to actual user interaction with the self-service device.

Detecting the start of the user activity at the self-service device may comprise detecting that a user has initiated a sign on process with the self-service device or otherwise signed on (e.g., provided his or her credentials). For example, the self-service device may determine that the user has inserted a card in the card reader 103, entered a character via the pin pad 105, provided biometrics via the biometric scanner 117, or otherwise interacted with the self-service device to initiate a sign on process.

Additionally or alternatively, detecting the start of the user activity at the self-service device may comprise detecting that a card has been inserted into a card reader (e.g., card reader 103) at the self-service device 101. For example, the user may have inserted a bank card, a debit card, a credit card, and the like, into the card reader 103.

In step 310, the self-service device may determine whether an action has been detected. In some aspects, the self-service device may use one or more of its sensors to capture one or more images each time an action during the user activity (e.g., user session) is detected. As a brief example, the self-service device may capture an image for each of the following (non-exhaustive) actions or events: a card is scanned, the user authenticates or otherwise signs on to the self-service device, the machine makes a call to ask what language the user wants displayed, the machine displays a main menu, the user selects a withdrawal button, the user selected a cash or check amount, the user selected a dispense amount, the dispenser dispensed cash or a check, the user takes the cash or check, the user takes the receipt, among numerous other events that may occur at the self-service device.

In step 315, the self-service device may identify a sensor to capture one or more images associated with the detected action. The self-service device may capture numerous images using one or more of the sensors described herein. For example, the biometric scanner 117 may scan an image of the user's biometrics, such as a fingerprint, a face, an iris, or any other biometric. The camera for the safe 119 may capture images of the safe and/or the door of the safe (e.g., when it is opened and/or closed). The acceptor scanner 121 may capture images of, for example, an image of a check inserted via the currency acceptor 109. The receipt camera 125 (and/or a scanner) may capture an image of a receipt for, for example, a check deposit.

In step 320, the self-service device may use the sensor to capture one or more images associated with the detected action. For example, in response to detecting the start of the user activity at the self-service device, the self-service device may capture, by one or more of the plurality of sensors, a plurality of images of the user activity at the self-service device. Examples of sensor used to captures images were previously described.

In step 325, the self-service device may determine whether the user activity at the self-service device has ended. In some aspects, this may be the end of the user transaction or session at the self-service device. Detecting the end of the user activity at the self-service device may comprise detecting that the user has initiated a sign off process with the self-service device. For example, the user may have selected a sign off button displayed on a touch screen display of the self-service device. As another example, the user may have removed his or her card from the card reader 103, and detecting the end of the user activity at the self-service device may comprise detecting that the card has been removed from the card reader 103 at the self-service device.

In step 330, the self-service device may generate data indicative of the user activity. The data indicative of the user activity at the self-service device may comprise the plurality of images of the user activity captured by the one or more of the plurality of sensors. The data may also include, for example, transaction amount (e.g., in dollars), time stamps (e.g., start and end times of user activity, start and end time of user actions, and the like), an identifier for the self-service device (e.g., a machine name or number), any relevant error codes, data attributed to bank cards, debit cards, credit cards, and other data indicative of the user activity.

In step 335, the self-service device may transmit, via a connection, the data indicative of the user activity to a server (e.g., a remote server). Prior to transmitting the data, the self-service device may establish a connection between the self-service device and the server. In some aspects, the self-service device may capture all image files for (and for all actions occurring during) a certain time period (e.g., from detection of user activity to the end of the user activity). The self-service device may package the image files and send them to the server, as described herein. That is, every single image taken during the time period may be sent to the server, and made part of, for example, a journal or ledger.

In some aspects, even if a user has not completed a transaction at the self-service device (e.g., a check or cash deposit), the self-service device may use one or more of its sensors to capture images throughout the user's interaction with the self-service device. Beneficially, the images may be referenced in the future. If a certain item or type of item (e.g., thick paper, a bubble gum wrapper, or other item that the self-service device cannot accept) causes a fault at the self-service device, the self-service device may capture images of these items for real-time or future reference.

Figure 4:
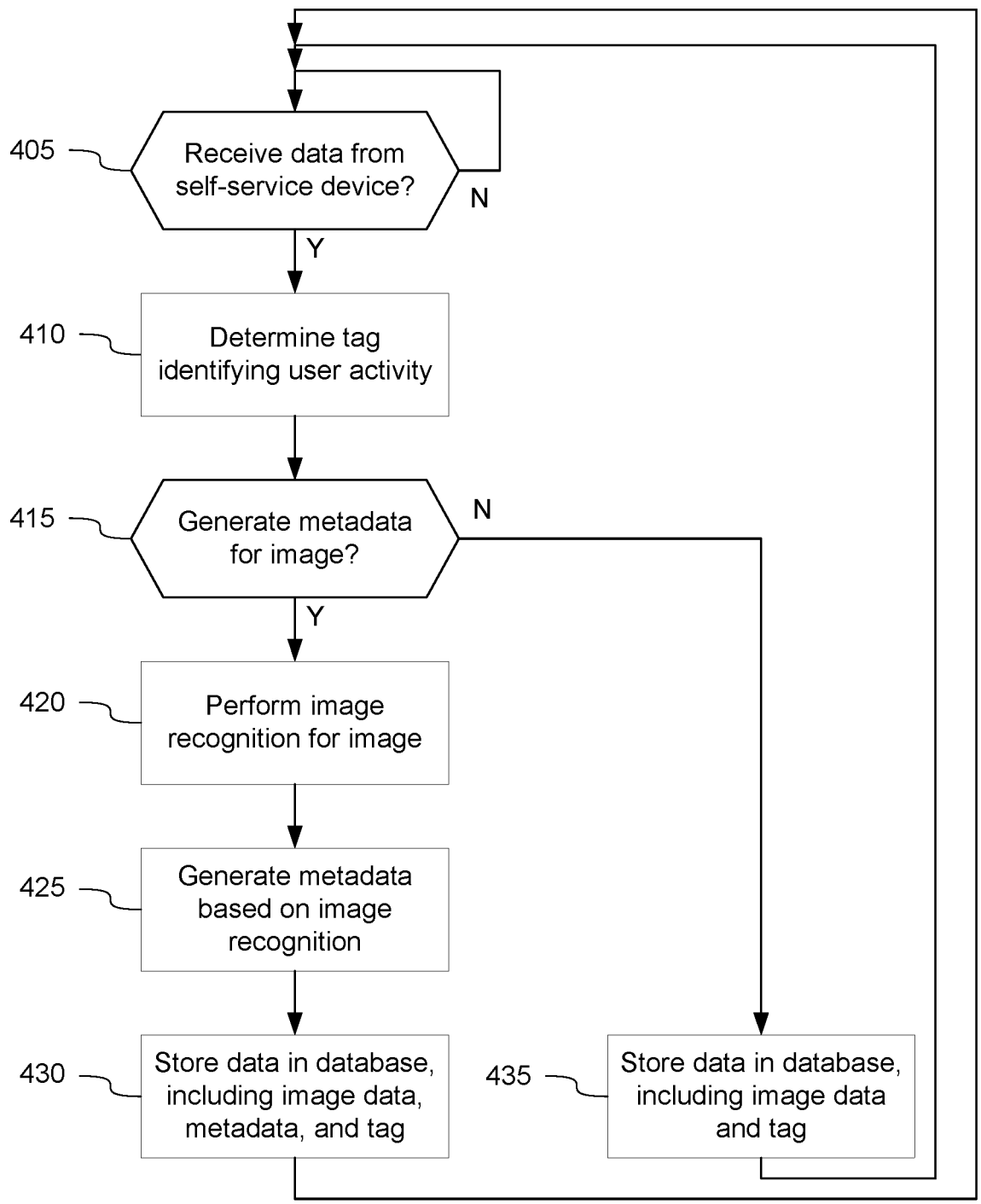
FIG. 4 illustrates an example of at least a portion of a flow diagram for receiving data from one or more self-service devices and storing the data in association with one or more other pieces of data in which various aspects of the disclosure may be implemented.

FIG. 4 illustrates an example of at least a portion of a flow diagram for receiving data from one or more self-service devices and storing the data in association with one or more other pieces of data in which various aspects of the disclosure may be implemented.

In step 405, the server may determine whether it has received, from a self-service device, data indicative of user activity. If the server has not received data (step 405: N), the server may wait to receive data in step 405. The server may be connected to a plurality of self-service devices and can thus receive user activity data from a plurality of self-service devices. For example, the server may receive, from one self-service device and via an established connection, data indicative of user activity at the self-service device (step 405: Y) and proceed to step 410.

In step 410, the server may determine one or more tags used to identify the user activity. A tag may be used to identify the user activity, such as a transaction or a session at the self-service device. That is, the tag may be specific to the session at the self-service device. The tag may comprise an alphanumeric identifier unique to the transaction or session at the self-service device. As will be described in further detail below, the tag may be used to identify data, such as image data, captured during the user session or transaction.

In step 415, the server may determine whether to generate certain types of metadata for one or more images in the data received from the self-service device. For example, metadata may include data descriptive of one or more items or characters on the image, as will be described in more detail below.

In step 420, the server may perform image recognition for one or more of the images in the received data. For example, the server may perform optical character recognition (OCR) to identify one or more characters on an image. If the image is a check, the server may be able to identify the payee, the payer, the check amount, whether a signature is present, among other pieces of information on the check. The server may additionally or alternatively validate that the image is of an actual check, such as by detecting magnetic ink. The server may determine a confidence level that the item is what it purports to be (e.g., that the check is actually a check). Image recognition may additionally or alternatively be performed at the self-service device, and the results of image recognition may be transmitted by the self-service device to the server.

In step 425, the server may generate metadata for the images based on output from the image recognition process. As noted above, the metadata may describe one or more aspects of the image, such as a check amount, a confidence level, a payee, and the like. Information may be encoded to a text format so that text-based systems may be able to read the information. The server may also encrypt the data prior to storage.

In step 430, the server may store the data in a database. The stored data may include, for example, one or more of the captured images, the generated metadata, and one or more tags. The captured images may be stored in any image format, including JPEG, PNG, GIF, TIFF, and the like. In some aspects, after receiving the data indicative of the user activity at the self-service device, the server may store, in the database, the data indicative of the user activity at the self-service device in association with a tag that identifies the user activity. In some aspects, the data may be stored as a journal entry, as an entry in the database, as a web call, or in another fashion. Data from the database (e.g., image or transaction data) may be retrieved from the database using one or more tags identifying the user activity having the image data. In step 435, the server might store data in the database, but the data might not include certain types of metadata for the captured images. In some aspects, the database may be configured to store a plurality of discrete data, and each of the plurality of discrete data may be indicative of a user session at a self-service device. Each of the plurality of discrete data may be stored in association with a corresponding tag that identifies the user session, as described herein.

Figure 5:
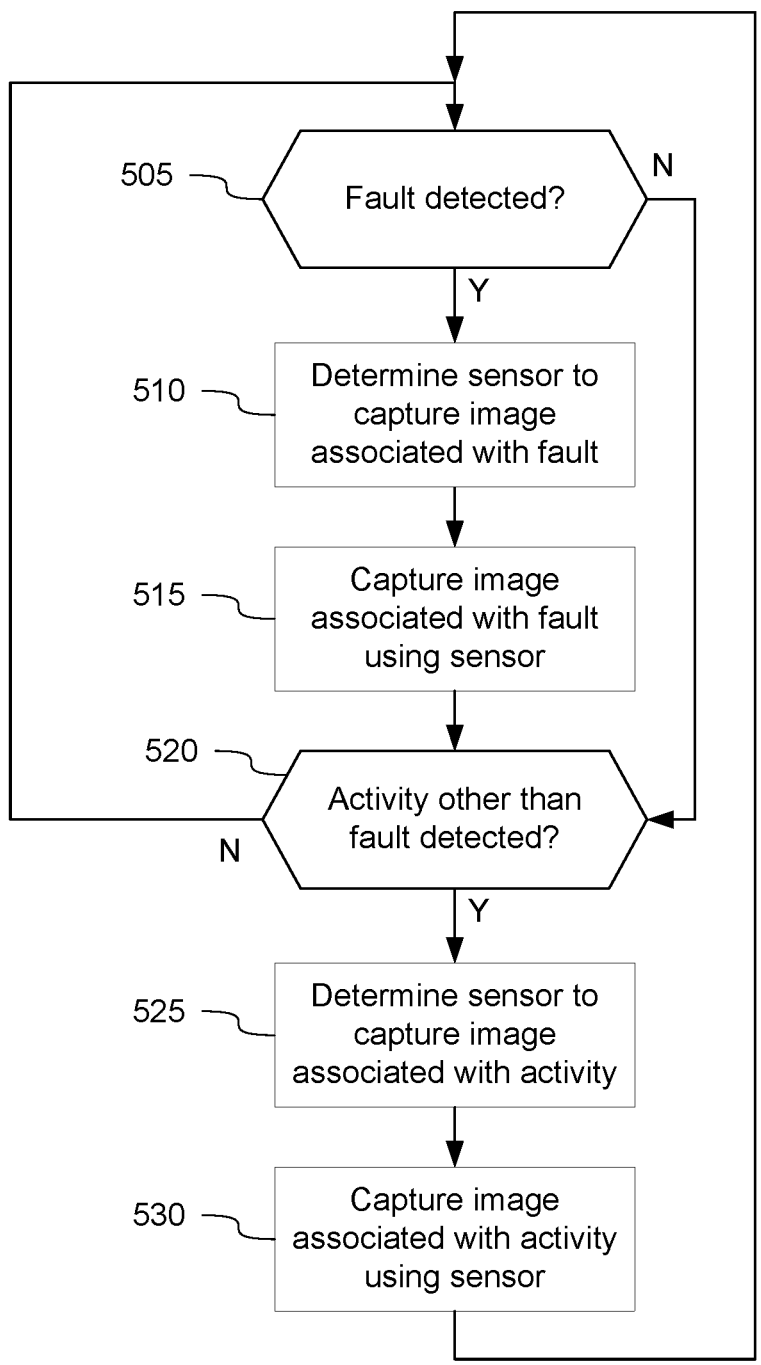
FIG. 5 illustrates an example of at least a portion of a flow diagram for capturing images associated with a fault and/or activity other than a fault in which various aspects of the disclosure may be implemented.

FIG. 5 illustrates an example of at least a portion of a flow diagram for capturing images associated with a fault and/or activity other than a fault in which various aspects of the disclosure may be implemented. In particular, images for events at the self-service device may be captured during a user session or transaction, whether the events are faults or not.

In step 505, the self-service device may determine whether a fault has been detected, such as during a user session. Faults include, but are not limited to, a jammed check or cash (e.g., at the currency acceptor 109 or at another device within the self-service device 101), a failure to read, process, and/or recognize the user's biometrics, a failure to verify credentials supplied by the user, a jammed card (e.g., at the card reader 103 or at another device within the self-service device 101), a broken component or device, running out of printer paper for the receipt printer 113, and other faults that may affect normal operation of the self-service device or may negatively affect a user's account.

In step 510, the self-service device may identify a sensor to capture one or more images associated with the fault. For example, if the fault is a jammed check at the currency acceptor 109, the self-service device may identify the dispenser camera 123 for capturing one or more images of the jammed check. If the fault is an unauthorized opening of a self-service device safe, the self-service device may identify the camera for the safe 119 for capturing one or more images of the safe. The self-service device may select any of the sensors illustrated in FIG. 1 to capture images associated with the fault.

In step 515, the self-service device, using the identified sensor, may capture one or more images associated with the fault. In other words, the self-service device may capture, by one or more of the plurality of sensors, one or more images associated with the fault in response to detecting the fault during the user session.

In step 520, the self-service device may determine whether an activity (e.g., during the user session) that is not a fault has been detected. Non-exhaustive examples of activities or events that are not faults include, but are not limited to, the user successfully inserting a bank card into the card reader, the user successfully authenticating using the biometric scanner, the user entering a check or cash through the currency acceptor, the user receiving cash via the currency dispenser, the self-service device printing a receipt using the receipt printer, among other non-fault events.

In step 525, the self-service device may identify a sensor to capture one or more images associated with the activity that is not a fault. In step 530, the self-service device, using the identified sensor, may capture one or more images associated with the activity that is not a fault. In other words, the self-service device may capture, by one or more of the plurality of sensors, one or more image associated with the activity that is not a fault in response to detecting the activity during the user session that is not a fault.

Figure 6:
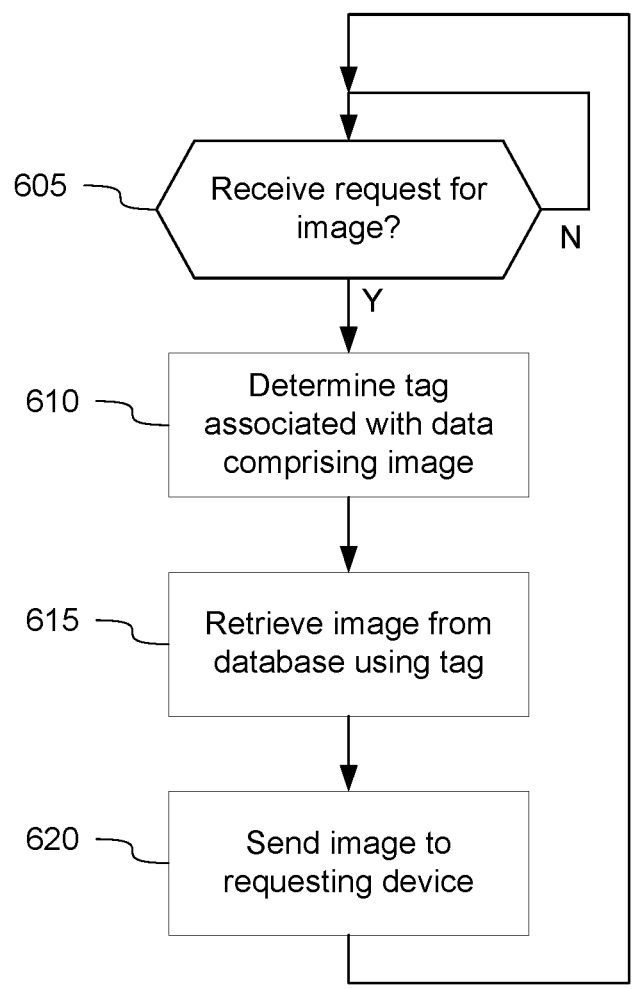
FIG. 6 illustrates an example of at least a portion of a flow diagram for receiving a request for one or more images, retrieving the images, and sending the images to a requesting device in which various aspects of the disclosure may be implemented.

FIG. 6 illustrates an example of at least a portion of a flow diagram for receiving a request for one or more images, retrieving the images, and sending the images to a requesting device in which various aspects of the disclosure may be implemented. For example, the data stored in databases may be referenced in the future by a customer, by a financial institution, or by others.

In step 605, the server may determine whether a request for one or more images has been received. For example, the server may receive a user request for an image of a receipt for a check deposit.

In step 610, the server may identify one or more tags associated with data comprising the one or more images. As previously described, the data for a user session or transaction at a self-service device may be stored in association with one or more tags.

In step 615, the server may retrieve the one or more images using the identified tag(s). That is, in response to receiving the user request for the image(s), the server may retrieve, from the database, one or more of the requested images, such as an image of the receipt for a check deposit.

In step 620, the server may send the one or more requested images to a requesting device, such as a user device (e.g., a mobile device). For example, if an image of a receipt (e.g., for a check deposit) was requested, the server may send the image of the receipt to the requesting device.

Aspects described herein may be used in various scenarios. For example, in the event of a fault, the server may start processing a customer's transaction to make them whole (e.g., if a fault, such as a check jam, occurred). The data, including image data, stored at the database may be retrieved by its tag. As previously described, the tag may be associated with a particular user session or transaction. The data may be automatically retrieved to process the transaction, even if the check is still jammed in the machine, because images of the check may be available from external or internal cameras or scanners.

As another example, a customer may be interested in an advertisement on the receipt, but may have thrown away the receipt. The customer may send, via a user device, a request for an image of the receipt to identify the ad. The server may receive the request from the user device, identify the packaged data based on a tag associated with the user's session at the self-service device, extract an image of the receipt from the packaged data, and send the image to the user device for display on a display of the user device. Accordingly, the customer may be able to identify the advertisement.

As yet another example, image data may be used to identify causes of faults. For example, a specific type of paper and/or paper having a particular thickness (e.g., cardboard) may be causing jams at certain self-service devices. The server may retrieve images associated with the jams and use image recognition to determine the specific cause of the jams (e.g., the type and/or thickness of the paper).

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system comprising:
   a server comprising:
      a first processor;
      a database; and
      first memory storing computer-executable instructions; and
   a self-service device comprising:
      a second processor;
      a plurality of sensors configured to capture images; and
      second memory storing computer-executable instructions that, when executed by the second processor, cause the self-service device to:
         detect a start of user activity at the self-service device, the user activity including a plurality of actions, the plurality of actions including a plurality of physical actions of a user including at least one of: scanning a card, user authentication, user selecting a first option, user selecting a second option, and user removing dispensed funds, and actions performed by the self-service device including at least one of: the self-service device making a call to request a preferred language and the self-service device displaying a main menu;
         in response to detecting the start of the user activity at the self-service device, capture, by one or more of the plurality of sensors, a plurality of images of the user activity at the self-service device, the plurality of images including images corresponding to each action of the plurality of actions;
         detect a fault during the user activity;
         in response to detecting the fault during the user activity:
            identify a first sensor of the plurality of sensors to capture one or more images associated with the fault, wherein the plurality of sensors includes at least two of: a dispenser camera, a biometric scanner, a safe camera, an acceptor scanner and a receipt camera;
            select, by the self-service device, and based on the fault, the identified first sensor; and
            capture, by the selected first sensor, the one or more images associated with the fault;
         detect an end of the user activity at the self-service device;
         in response to detecting the end of the user activity at the self-service device, generate data indicative of the user activity at the self-service device, wherein the data indicative of the user activity at the self-service device comprises the plurality of images including images of each action of the user activity and the one or more images associated with the fault captured by the identified first sensor and a requested transaction;
         establish a connection between the self-service device and the server;
         transmit, to the server and via the established connection, the data indicative of the user activity at the self-service device; and
         cause the requested transaction to be performed based at least in part on the one or more images associated with the fault;
   wherein the first memory of the server stores computer-executable instructions that, when executed by the first processor, cause the server to:
      receive, from the self-service device and via the established connection, the data indicative of the user activity at the self-service device; and
      store, in the database, the data indicative of the user activity at the self-service device in association with a tag that identifies the user activity.

2. The system of claim 1, wherein:
   the plurality of sensors further comprises a video camera, and
   detecting the start of the user activity at the self-service device comprises detecting, prior to user interaction with the self-service device and based on one or more images captured by the video camera, motion of a user in proximity of the self-service device.

3. The system of claim 1, wherein:
   detecting the start of the user activity at the self-service device comprises detecting that a user has initiated a sign on process with the self-service device, and
   detecting the end of the user activity at the self-service device comprises detecting that the user has initiated a sign off process with the self-service device.

4. The system of claim 1, wherein:
detecting the start of the user activity at the self-service device comprises detecting that a card has been inserted into a card reader at the self-service device, and
detecting the end of the user activity at the self-service device comprises detecting that the card has been removed from the card reader at the self-service device.

5. The system of claim 1, wherein the user activity comprises a user session at the self-service device, and wherein the second memory stores computer-executable instructions that, when executed by the second processor, cause the self-service device to:
detect an activity during the user session that is not a fault; and
in response to detecting the activity during the user session that is not a fault, capture, by one or more of the plurality of sensors, one or more image associated with the activity that is not a fault.

6. The system of claim 1, wherein the plurality of images comprises an image of a check captured by a first scanner, an image of a receipt for a check deposit captured by a second scanner or a first camera, and an image of at least a portion of a user's hand or face captured by a second camera.

7. The system of claim 6, wherein the first memory of the server stores computer-executable instructions that, when executed by the first processor, cause the server to:
receive a user request for the image of the receipt for the check deposit, and
in response to receiving the user request, retrieve, from the database, the image of the receipt for the check deposit; and
send, to a user device, the image of the receipt for the check deposit.

8. The system of claim 6, wherein the database is configured to store a plurality of discrete data, wherein each of the plurality of discrete data is indicative of a user session at the self-service device, and wherein each of the plurality of discrete data is stored in association with a corresponding tag that identifies the user session.

9. A self-service device comprising:
a processor;
a plurality of sensors configured to capture images; and
memory storing computer-executable instructions that, when executed by the processor, cause the self-service device to:
detect a start of user activity at the self-service device, the user activity including a plurality of actions, the plurality of actions including a plurality of physical actions of a user including at least one of: scanning a card, user authentication, user selecting a first option, user selecting a second option, and user removing dispensed funds, and actions performed by the self-service device including at least one of: the self-service device making a call to request a preferred language and the self-service device displaying a main menu;
in response to detecting the start of the user activity at the self-service device, capture, by one or more of the plurality of sensors, a plurality of images of the user activity at the self-service device, the plurality of images including images corresponding to each action of the plurality of actions;
detect a fault during the user activity;
in response to detecting the fault during the user activity:
identify a first sensor of the plurality of sensors to capture one or more images associated with the fault, wherein the plurality of sensors includes at least two of: a dispenser camera, a biometric scanner, a safe camera, an acceptor scanner and a receipt camera;
select, based on the fault, the identified first sensor; and
capture, by the selected first sensor, the one or more images associated with the fault;
detect an end of the user activity at the self-service device;
in response to detecting the end of the user activity at the self-service device, generate data indicative of the user activity at the self-service device, wherein the data indicative of the user activity at the self-service device comprises the plurality of images including images of each action of the user activity and the one or more images associated with the fault captured by the identified first sensor and a requested transaction;
establish a connection between the self-service device and a server;
transmit, to the server and via the established connection, the data indicative of the user activity at the self-service device for storage, in a database associated with the server, of the data indicative of the user activity in association with a tag that identifies the user activity; and
cause the requested transaction to be performed based at least in part on the one or more images associated with the fault.

10. The self-service device of claim 9, wherein:
the plurality of sensors further comprises a video camera, and
detecting the start of the user activity at the self-service device comprises detecting, prior to user interaction with the self-service device and based on one or more images captured by the video camera, motion of a user in proximity of the self-service device.

11. The self-service device of claim 9, wherein:
detecting the start of the user activity at the self-service device comprises detecting that a user has initiated a sign on process with the self-service device, and
detecting the end of the user activity at the self-service device comprises detecting that the user has initiated a sign off process with the self-service device.

12. The self-service device of claim 9, wherein:
detecting the start of the user activity at the self-service device comprises detecting that a card has been inserted into a card reader at the self-service device, and
detecting the end of the user activity at the self-service device comprises detecting that the card has been removed from the card reader at the self-service device.

13. The self-service device of claim 9, wherein the user activity comprises a user session at the self-service device, and wherein the memory stores computer-executable instructions that, when executed by the processor, cause the self-service device to:
detect an activity during the user session that is not a fault; and
in response to detecting the activity during the user session that is not a fault, capture, by one or more of the plurality of sensors, one or more image associated with the activity that is not a fault.

14. The self-service device of claim 9, wherein the plurality of images comprises an image of a check captured by a first scanner, an image of a receipt for a check deposit captured by a second scanner or a first camera, and an image of at least a portion of a user's hand or face captured by a second camera.

15. A method comprising:

detecting a start of user activity at a self-service device, the user activity including a plurality of actions, the plurality of actions including a plurality of physical actions of a user including at least one of: scanning a card, user authentication, user selecting a first option, user selecting a second option, and user removing dispensed funds, and actions performed by the self-service device including at least one of: the self-service device making a call to request a preferred language and the self-service device displaying a main menu;

in response to detecting the start of the user activity at the self-service device, capturing, by one or more of a plurality of sensors of the self-service device, a plurality of images of the user activity at the self-service device, the plurality of images including images corresponding to each action of the plurality of actions;

detecting a fault during the user activity;

in response to detecting the fault during the user activity:
identifying a first sensor of the plurality of sensors to capture one or more images associated with the fault, wherein the plurality of sensors includes at least two of: a dispenser camera, a biometric scanner, a safe camera, an acceptor scanner and a receipt camera;
selecting, by the self-service device, and based on the fault, the identified first sensor; and
capturing, by the selected first sensor, the one or more images associated with the fault;

detecting an end of the user activity at the self-service device;

in response to detecting the end of the user activity at the self-service device, generating data indicative of the user activity at the self-service device, wherein the data indicative of the user activity at the self-service device comprises the plurality of images including images of each action of the user activity and the one or more images associated with the fault captured by the identified first sensor and a transaction request;

establishing a connection between the self-service device and a server;

transmitting, to the server and via the established connection, the data indicative of the user activity at the self-service device for storage, in a database associated with the server, of the data indicative of the user activity in association with a tag that identifies the user activity; and causing the requested transaction to be performed based at least in part on the one or more images associated with the fault.

16. The method of claim 15, wherein:

the plurality of sensors further comprises a video camera, and detecting the start of the user activity at the self-service device comprises detecting, prior to user interaction with the self-service device and based on one or more images captured by the video camera, motion of a user in proximity of the self-service device.

17. The method of claim 15, wherein:

detecting the start of the user activity at the self-service device comprises detecting that a user has initiated a sign on process with the self-service device, and detecting the end of the user activity at the self-service device comprises detecting that the user has initiated a sign off process with the self-service device.

18. The method of claim 15, wherein:

detecting the start of the user activity at the self-service device comprises detecting that a card has been inserted into a card reader at the self-service device, and detecting the end of the user activity at the self-service device comprises detecting that the card has been removed from the card reader at the self-service device.

* * * * *